Nov. 2, 1965  P. L. FRANCIS  3,215,341
REFRIGERATING APPARATUS
Filed Jan. 18, 1963  6 Sheets-Sheet 1

INVENTOR.
Philip L. Francis
BY John C. Evans
His Attorney

INVENTOR.
Philip L. Francis
BY John C. Evans
His Attorney

INVENTOR.
Philip L. Francis
BY
His Attorney

Nov. 2, 1965 P. L. FRANCIS 3,215,341
REFRIGERATING APPARATUS
Filed Jan. 18, 1963 6 Sheets-Sheet 4

INVENTOR.
Philip L. Francis
BY John C. Evans
His Attorney

United States Patent Office 3,215,341
Patented Nov. 2, 1965

1

3,215,341
REFRIGERATING APPARATUS
Philip L. Francis, Rochester, Mich., assignor to General Motors Corporation, Detroit, Mich., a corporation of Delaware
Filed Jan. 18, 1963, Ser. No. 252,346
12 Claims. (Cl. 230—186)

This invention relates to a refrigerating apparatus and more particularly to a swash plate compressor for use in refrigerating systems and the like.

Objects of the present invention are to improve multiple cylinder, reciprocating compressors of the type disclosed in Patent No. 3,057,545 to George P. Ransom et al.; and to improve such a compressor by providing means defining an extremely compact housing having a low profile suitable for use in refrigeration systems or the like arranged in relatively small spaces.

Further objects of the invention are to improve such a compact compressor by providing a cylinder block arrangement serving as the compressor housing with said block being split along the longitudinal axis thereof for quick and easy assembling of the compressor unit; and to provide a multiple cylinder compressor of the above described type which lends itself to mass production.

A further object of the invention is to provide such a compact, quickly assembled compressor unit having means associated therewith for assuring cylinder bore alignment therein and improved seal means for preventing the escape of fluid therefrom.

Still another object of the invention is to provide improved means for holding the cylinder block portions of such a compressor together and for holding reed valves controlling fluid flow into and out of the compressor tightly between cylinder heads thereon and end portions of the cylinder block.

A further object of the present invention is to include improved means in a compressor of the above stated type for lubricating the operative parts thereof.

Further objects and advantages of the present invention will be apparent from the following description, reference being had to the accompanying drawings wherein a preferred embodiment of the present invention is clearly shown.

2

Referring now to the drawings, a preferred embodiment of the invention is shown, including a housing 20 constructed in accordance with certain of the principles of the present invention as an extremely compact unit having an unusually low profile and a split line 22 directed longitudinally thereof and extending therethrough to form upper and lower cylinder block halves 24, 26 supporting a pair of cylinder heads 28, 30 for closing the opposite ends of the housing 20, as best shown in FIGURES 1 through 4. Reference numeral 32 designates the compressor drive shaft having a swash plate 34 keyed thereon for rotation therewith. The swash plate 34 is operatively associated with three double acting die cast pistons 36 arranged to reciprocate in a direction substantially parallel to the axis of the drive shaft 32.

Each of the cylinder block halves 24, 26 include pairs of oppositely aligned cylinder bores 38 directed longitudinally thereof in which the pistons 36 reciprocate in response to rotation of the shaft 32. More particularly, each of the pistons 36 has a recess 39 formed in one side thereof for receiving the outer periphery of the swash plate 34 so that the ends of each of the pistons 36 straddle the swash plate 34 with sufficient clearance being provided therebetween for ball bearings 40 supported in sockets 42 formed in the inside surface of the pistons 36 and thrust bearing shoes 44 slidably supported on the faces of the swash plate 34 with ball bearings 40 and thrust bearing shoes 44 acting to translate rotation of the drive shaft 32 and swash plate 34 into reciprocation of the pistons 36 within the cylinder bores 38.

The provision of a housing 20 having a longitudinal split line 22 therein represents an improvement over prior double-acting swash plate pumps of this type wherein the cylinder block is split transversely of the housing in a manner that locates the opposed axially aligned cylinder bores therein in different castings. In such arrangements, it is necessary to line bore and hone the cylinder bores to prevent undesirable wear between the cylinder bore walls and the pistons reciprocating therein and it is also necessary to carefully align the cylinder block halves relative to one another during the assembly thereof. In the present invention such problems are obviated since the oppositely aligned cylinder bores 38 are formed in the same cylinder block half so as to eliminate the need for alignment and honing to compensate for misalignment during assembly as was previously the case and yet the housing 20 is still split into a two-piece construction for assembly purposes.

In the preferred embodiment the piston pumping loads are assumed by radial needle bearings 46 supported within a bore 48 formed by the cylinder blocks 24, 26 centrally of the housing 20 on either end of the drive shaft 32 and two needle thrust bearings 50 supported between the central portion of the drive shaft 32 and the cylinder block halves 24, 26 by means of washers 51.

Figure 1:
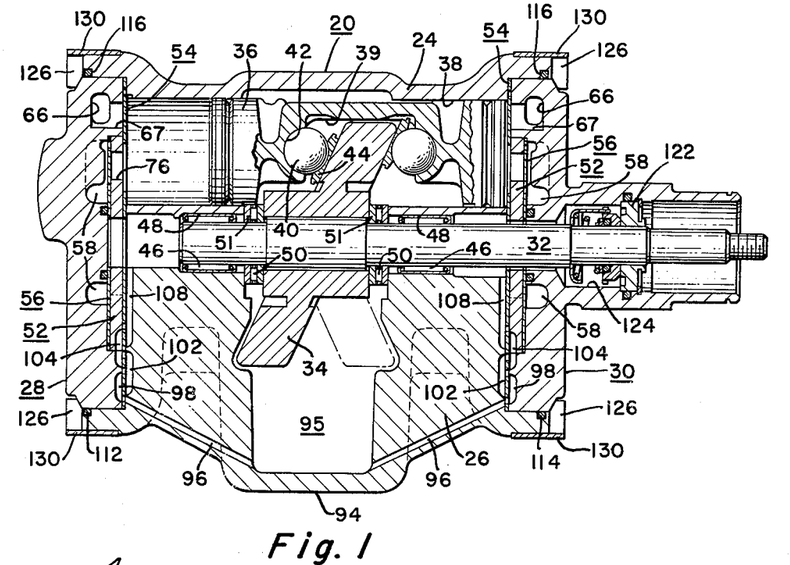
FIGURE 1 is a view in vertical section of the compressor.
Figure 2:
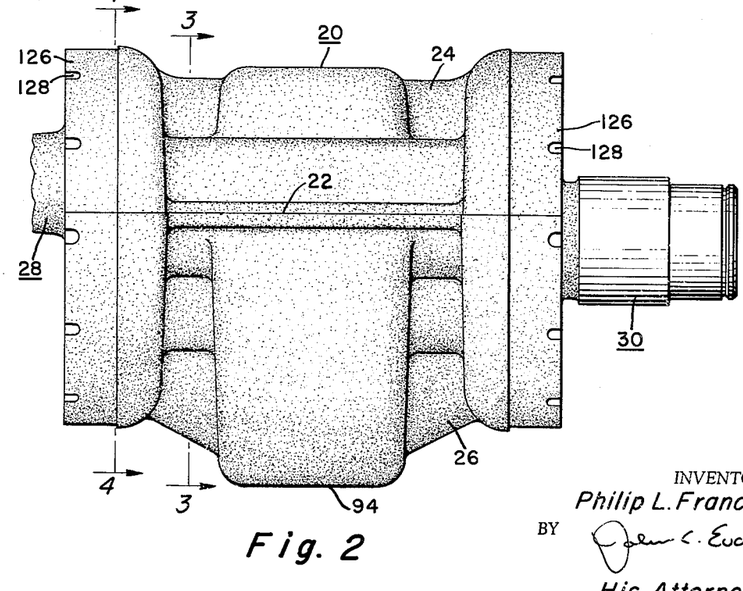
FIGURE 2 is a side elevational view of the compressor cylinder block.

A valve plate 52, intake reed disc 54 and outlet reed disc 56 is provided adjacent each end of the cylinder block halves 24, 26 as best illustrated in FIGURE 1, for controlling fluid flow between the pumping chambers and discharge chambers 58 and suction chambers 60 formed in the cylinder heads 28, 30 and in the ends of the upper and lower cylinder block halves 24, 26, respectively.

The gas to be compressed passes through an inlet line 62 and inlet port 64 in the inlet reed disc 54 into one of the suction chambers 60 as best illustrated in FIGURES 4, 6, 10, and 13–16, where it can be seen that said one of the suction chambers 60 communicates with the other of the suction chambers 60 through openings 65 in the inlet reed disc 54 and an aperture 66 in the upper end of the cylinder head 28. An opening 67 from aperture 66 communicates with one cylinder bore 38 and both suction chambers 60 communicate through passageways 68 in disc 54 with circumferentially spaced arcuate passageways 69 in the edge of the head 28 having an opening 70 therefrom communicating with the cylinder bores 38 at one end of the pistons 36 for conveying suction gas from the suction chambers 60 thereto. Inlet reeds 71 in the inlet disc 54 block communication between the bores 38 and the openings 70 during a discharge stroke.

Compressed gas passes from the pumping chambers through concentrically arranged openings 74, 76 in the inlet reed disc 54 and valve plate 52, respectively, and thence across reeds 77 in the discharge reed disc 56 that cooperate with raised islands 78 formed on the inside surface of the cylinder head 28 for controlling the flow of compressed gas from the pumping chambers into the discharge chamber 58 in the head 28 and out an outlet line 80 communicating therewith. In the preferred embodiment inlet and outlet lines are only present in the cylinder head 28 and, accordingly, means are provided to communicate the suction and discharge chambers 58, 60 at that end of the compressor with identical chambers in the opposite end thereof in order to provide communication to and from the pumping chambers on the opposite ends of the pistons.

Figures 3, 4, 5, 7:
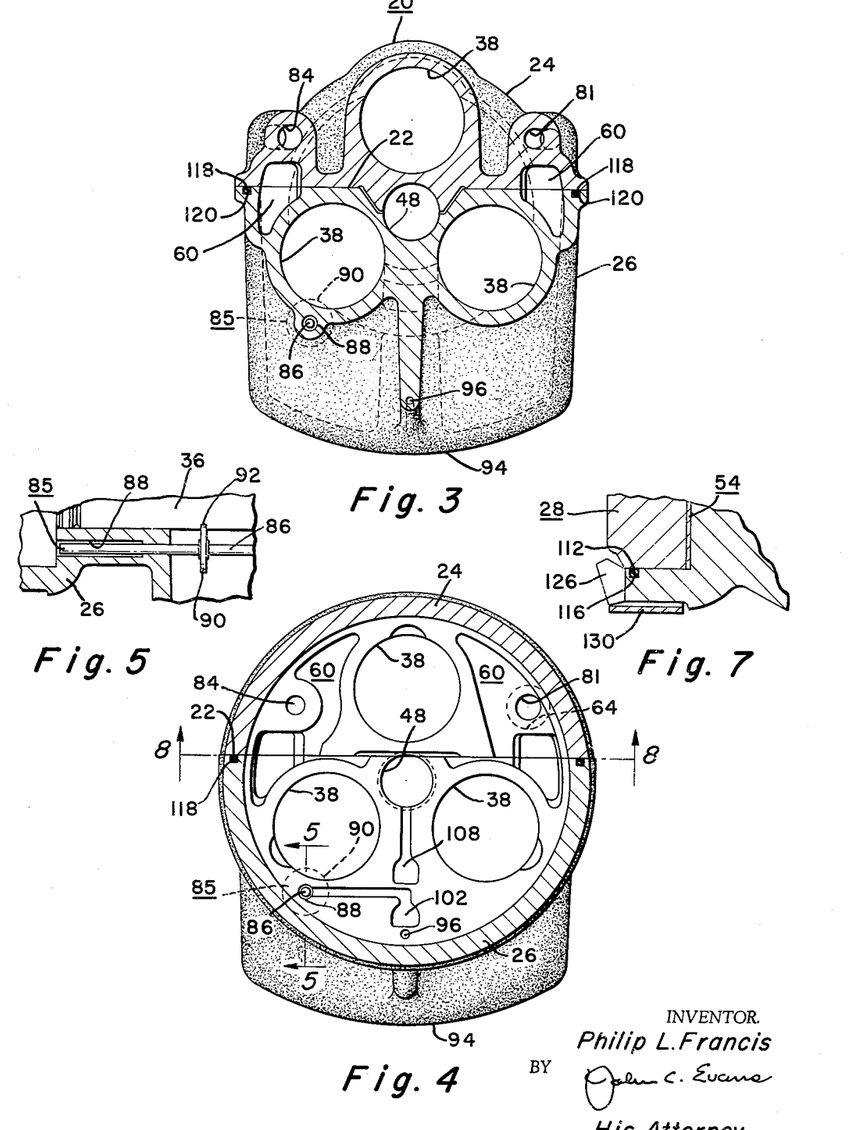
FIGURE 3 is a view in vertical section taken on the line 3—3 of FIGURE 2.
FIGURE 4 is a view in vertical section taken on the the line 4—4 of FIGURE 2.
FIGURE 5 is a fragmentary view in vertical section taken along the line 5—5 of FIGURE 4.
FIGURE 7 is a fragmentary sectional view taken on the line 7—7 of FIGURE 6.
Figure 6:
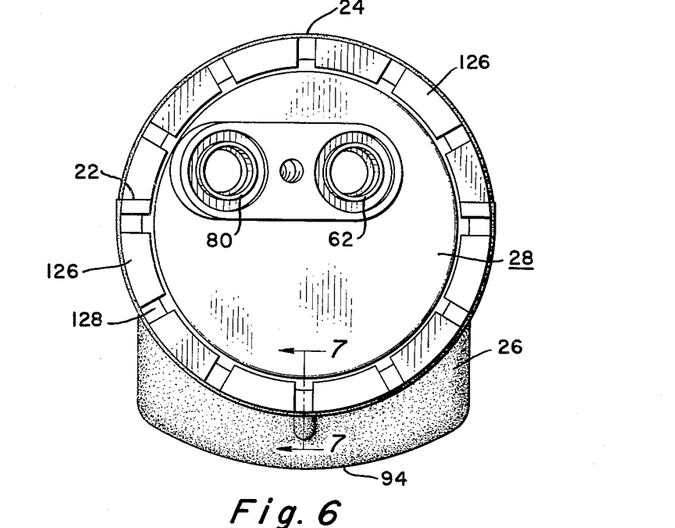
FIGURE 6 is a view in end elevation of the compressor cylinder block.
Figure 8:
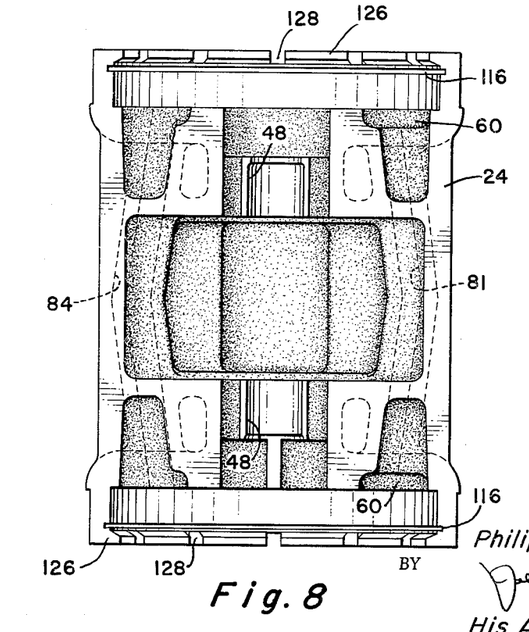
FIGURE 8 is a view in horizontal section taken on the line 8—8 of FIGURE 4.
Figure 9:
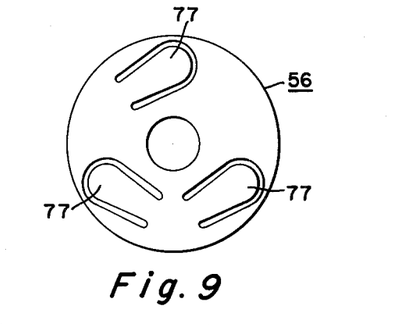
FIGURE 9 is an elevational view of an outlet reed disc.
Figure 10:
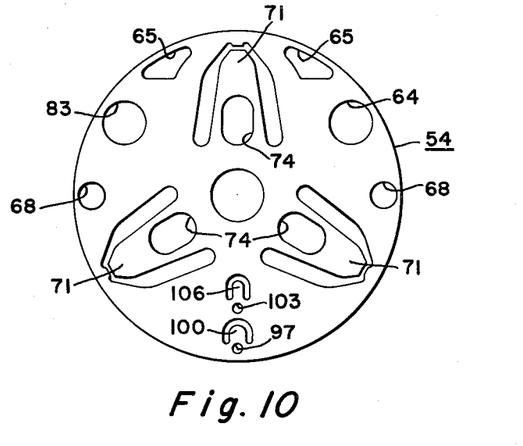
FIGURE 10 is an elevational view of an inlet reed disc.
Figure 11:
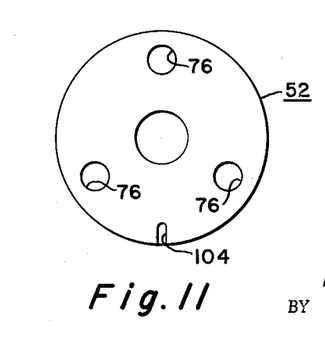
FIGURE 11 is an elevational view of a valve plate.
Figure 12:
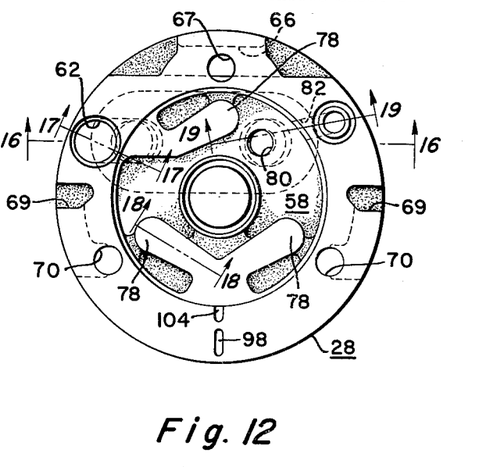
FIGURE 12 is a view of the inside of one of the cylinder heads.
Figure 13:
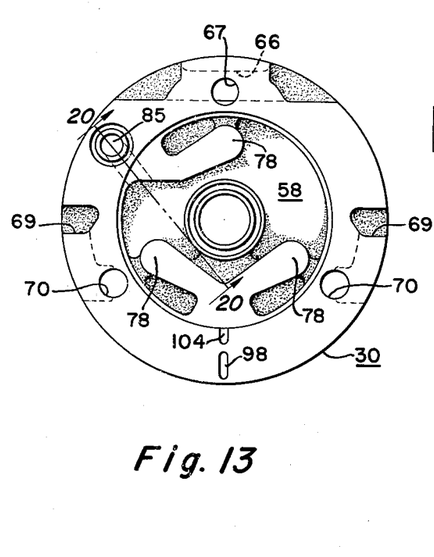
FIGURE 13 is a view of the inside of the other cylinder head.
Figure 14:
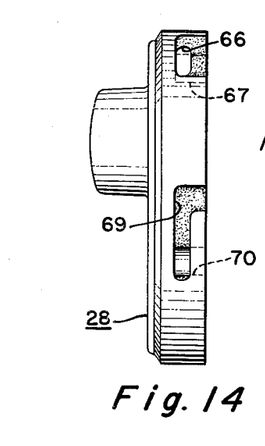
FIGURE 14 is a view in side elevation of the cylinder head of FIGURE 12.
Figure 15:
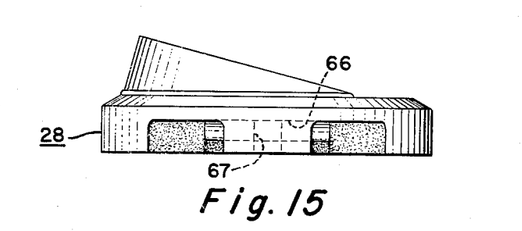
FIGURE 15 is a view in top elevation of the cylinder head of FIGURE 12.
Figure 16:
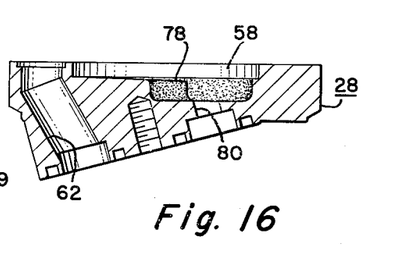
FIGURE 16 is a sectional view taken along the line 16—16 of FIGURE 12.
Figure 17:
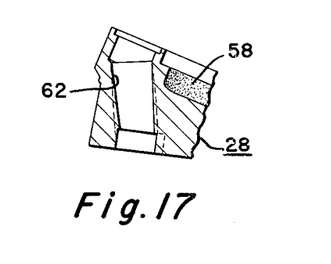
FIGURE 17 is a sectional view taken along the line 17—17 of FIGURE 12.
Figure 18:
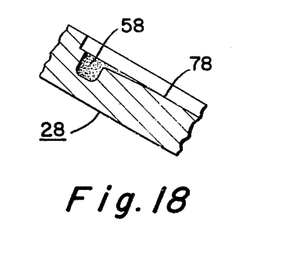
FIGURE 18 is a sectional view taken along the line 18—18 of FIGURE 12.
Figure 19:
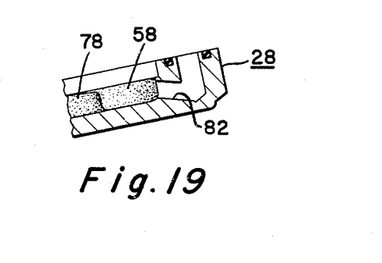
FIGURE 19 is a sectional view taken along the line 19—19 of FIGURE 12.
Figure 20:
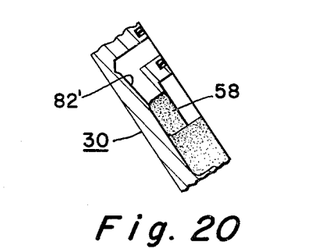
FIGURE 20 is a sectional view taken along the line 20—20 of FIGURE 13.

More particularly, the gas to be compressed is conveyed to the cylinder bores 38 in the opposite end of the housing 20 through a passageway 81 extending substantially longitudinally through the upper cylinder block half 24 having one end thereof communicating with one of the suction chambers 60 in the block 24 as best shown in FIGURE 4 and the opposite end thereof communicating with a like chamber on the opposite end of the cylinder block 24. Similarly, the discharge chamber 58 in the cylinder head 28 is interconnected with a like discharge chamber in the cylinder head 30 by a passageway 82 in head 28, opening 83 in the discs 54, a passageway 84 extending through the opposite side of the cylinder block half 24, and a passageway 82' in head 30 so that the gas to be compressed and compressed gas will flow from either end of the double-acting pistons into and out of the inlet and outlet lines 62, 80. It will, of course, be appreciated that suitable inlet and outlet lines could be provided in the cylinder head 30 for supplying gas to and from the pumping chambers in that end of the compressor to thereby eliminate the need for cross-over passageways in the cylinder block though in the illustrated embodiment, and in accordance with certain of the principles of the present invention, the provision of an inlet and outlet line in only one of the cylinder heads is preferred in order to maintain the compressor unit as compact as possible.

In accordance with still another of the principles of the present invention, the bearing surfaces of the compressor are lubricated by means of an improved oil pump assembly 85 best illustrated in FIGURE 5 as comprising an elongated rod 86 directed through and slidably supported in an opening 88 directed longitudinally through one side of the lower cylinder block half 26 with said hole being arranged substantially parallel to the axis of the drive shaft 32 adjacent to one of the cylinder bores 38. The rod 86 is thereby located adjacent to one of the pistons 38 and connected thereto by means of a projection 90 having one end thereof secured to the rod 86 intermediate the ends thereof and the opposite end thereof engaging a slot 92 in said one of the pistons 36 for imparting the reciprocating motion thereof to the rod 86. Reciprocation of the rod 86 within opening 88 pumps lubricant from a bulged portion 94 in the bottom of the lower cylinder block half 26 serving as a lubricant reservoir 95 through a distribution system best shown in FIGURES 1 and 4 as including upwardly directed passageways 96 in each end of the cylinder block half 26 communicating with the reservoir and through openings 97 in discs 54 with recesses 98 formed in each of the cylinder heads 28, 30 from whence the lubricant passes across inlet reeds 100 in the inlet reed disc 54 and through recesses 102 formed in the lower portion of the ends of the cylinder block 26 into the opening 88. Lubricant is forced from the opening 88 by the rod 86 through an opening 103 in discs 54 into recesses 104 formed in the valve plates 52 and heads 28, 30 from whence it passes across outlet reeds 106 in the disc 54 and through recesses 108 formed in the ends of the block 26 into the shaft bore 48 and thence across the needle bearings 46 to return to the reservoir 95. Splash from the swash plate 34 will lubricate the thrust needle bearings 50 and will also lubricate the bearing surfaces between the pistons 36 and inside surfaces of the cylinder bores 38. If desired, suitable apertures can be provided across the heads of the pistons 36 for the return of any lubricant, liquid refrigerant or the like that might be present within the pumping chambers.

It should be noted that the cylinder opening 88 for the oil pump is made in two diameters, the diameter located closest to the reservoir 95 being of a relatively small diameter to provide a close fit with the elongated rod 86 for sealing purposes and the diameter farther out from the reservoir being of a larger diameter so that the piston pump is not required to fill and evacuate the cylinder completely during each lubricating pumping cycle. Accordingly, the relatively long piston stroke of the rod 86 will not produce turbulence, or cavitation in the lubricant pumping chamber and the problem of wire drawing found in such long piston stroke arrangements is substantially eliminated.

Figure 21:
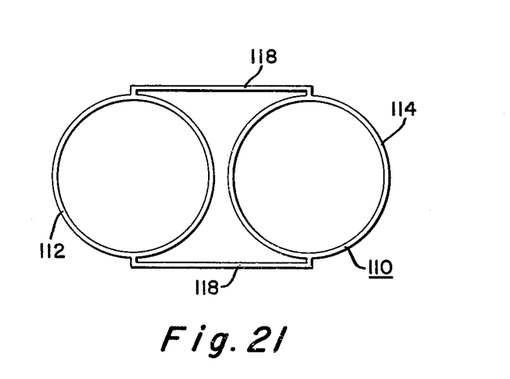
FIGURE 21 is a perspective view of a seal member.
Figure 22:
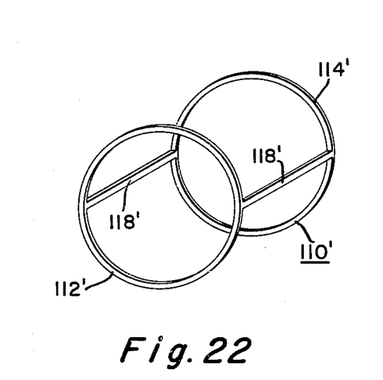
FIGURE 22 is a perspective view of a modification of the seal of FIGURE 21.

In accordance with still another of the principles of the present invention, improved means are provided for sealing the longitudinal split line 22 in the housing 20 between the cylinder block halves 24, 26 as well as the interface between the cylinder heads 28, 30 and the cylinder block halves 24, 26. The improved seal means, as best shown in FIGURES 1, 3, 21 and 22, comprises a one-piece sealing member 110 of a suitable resilient plastic material having a pair of spaced apart O-rings 112, 114 on either end thereof located in grooves 116 in the ends of cylinder block 20 for sealing the interface between it and the heads 28, 30 and a pair of elongated side portions 118 connected at diametrically spaced points on both the O-rings placed in grooves 120 in the cylinder block half 26 along the longitudinal split line 22 of the housing 20 for sealing against leakage thereacross. The improved sealing member 110 is preferably formed as a single-piece and may be molded, as shown in FIGURE 21, so that the O-ring seals 112, 114 and side portions 118 thereof are in substantially the same plane in which case the O-ring seals are twisted into a proper relationship with the cylinder blocks prior to assembly therein. In an alternative embodiment shown in FIGURE 22, the seal member can be molded as a single-piece member 110' with the O-ring seal portions 112', 114' and elongated side portions 118' thereof being in the positions assumed when installed in sealing relationship with the cylinder block and heads thereof.

In addition to the improved sealing member 110, the illustrated structure includes a shaft seal assembly 122 supported within a shaft seal cavity 124 formed in the cylinder head 30 with said shaft seal assembly 122 serving to prevent the escape of refrigerant and lubricant at the point where the drive shaft 32 enters the compressor housing 20.

Another feature of the present invention includes the manner in which the two cylinder heads 28, 30 and cylinder block 20 of the improved compressor are held in position once the compressor has been assembled. More particularly, means desirably should be included to hold the cylinder heads 28, 30 tightly in both a radial and an axial direction within the cylinder block 20 in order to assure positive sealing and for assuring that the valve elements are held tightly between the cylinder heads 28, 30 and cylinder block 20 so that the reed portions will positively control the flow of fluid in and out of the pumping chambers. Accordingly, the ends of the cylinder blocks 24, 26 include a plurality of circumferentially spaced radially inwardly directed tabs 126 separated by grooves 128 with said tabs being adapted to overlie and axially abut against the outside surfaces of the cylinder heads 28, 30 when the cylinder blocks 24, 26 have been finally assembled. The tabs 126 are initially in a relaxed position as shown exaggerated in FIGURE 7 but have sufficient flexibility to deflect axially inwardly against the cylinder heads 28, 30 when straps 130 located on the outer circumference of the housing 20 on either end thereof are drawn up to apply a radial force thereagainst. The radially inwardly directed force of the straps 130 will produce positive sealing between the cylinder heads 28, 30 and cylinder block halves 24, 26 and will also produce a sufficient axial force acting through the tabs 126 for holding the valving elements tightly between the heads 28, 30 and the ends of the block 20 for the reasons discussed above.

While the embodiment of the present invention, as herein disclosed, constitutes a preferred form, it is to be understood that other forms might be adopted.

What is claimed is as follows:

1. In a compressor, the combination of, a cylinder block having a split line directed longitudinally thereof and extending therethrough for separating said block into a plurality of elongated housing portions, each of said housing portions including a pair of spaced apart cylinder bores aligned along a common axis, a plurality of double-ended pistons arranged to reciprocate within said pairs of aligned cylinder bores, cylinder heads disposed adjacent each end of said cylinder block including inlet and discharge passageways therein for providing communication to and from said cylinder bores, one of said cylinder heads having an inlet and an outlet fitting thereon for directing fluid into and out of said compressor, one of said housing portions including an inlet passageway therethrough for communicating the inlet passageway in said one of said cylinder heads with the inlet passageway in the other of said cylinder heads, said one of said housing portions also including a discharge passageway therethrough for communicating the discharge passageway in said one of said cylinder heads with the discharge passageway in the other of said cylinder heads, a drive shaft directed longitudinally through said cylinder block having the axis thereof arranged substantially parallel to the axis of each of said double-ended pistons, a swash plate within said cylinder block secured to said shaft for rotation therewith, and means disposed between said swash plate and said double-ended pistons for converting rotation of said swash plate to reciprocation of said double-ended pistons within said cylinder portions whereby fluid is drawn through said inlet fitting into the inlet passageway in said one of said cylinder heads and through said inlet passageway in said one of said housing portions into the inlet passageway in the other of said cylinder heads and discharged through said discharge passageway in said one of said cylinder heads and through said discharge passageway in said one of said housing portions from said discharge passageway in the other of said cylinder heads.

2. In a compressor, a cylinder block forming opposed axially aligned cylinder bores, a double-ended piston having the opposite ends thereof slidably disposed in said opposed cylinder bores, a drive shaft having the opposite ends thereof journalled in said cylinder block with the axis thereof being substantially parallel to the axis of said double-ended piston, a swash plate mounted on said drive shaft for rotation therewith, means for translating the rotary movement of said swash plate into reciprocation of said double-ended piston, said cylinder block having a portion adjacent its lower side serving as a lubricant sump, bearing means for rotatably supporting said shaft, said cylinder block having an aperture therethrough directed substantially parallel to the axis of said double-ended piston, an elongated piston slidably mounted within said aperture including means thereon for operatively connecting said elongated piston to said double-ended piston for reciprocation therewith, means for conveying lubricant from said sump to said aperture, and means for distributing lubricant from said aperture to said bearing means.

3. In a compressor, a cylinder block having a split line directed longitudinally thereof and extending therethrough for separating said block into a plurality of elongated portions, each of said block portions including a pair of oppositely aligned cylinder bores having their axis extending in the general direction of said split line, a double-ended piston having the ends thereof slidably disposed in one of said pairs of oppositely aligned cylinder bores, cylinder heads disposed adjacent each end of said cylinder block including passageways therein for providing communication to and from said cylinder bores, means including bearings for reciprocating said double-ended piston within said cylinder bores, one of said elongated cylinder block portions having a section therein adjacent its lower side serving as a lubricant sump, said cylinder block having an aperture therethrough directed substantially parallel to the axis of said double-ended piston, an elongated piston slidably mounted within said aperture including means thereon for operatively connecting said elongated piston to said double-ended piston for reciprocation therewith, means for conveying lubricant from said sump to said aperture, and means for distributing lubricant from said aperture to said bearing.

4. In a compressor, a cylinder block having a split line directed longitudinally thereof and extending therethrough for separating said block into a plurality of elongated portions, each of said block portions including a pair of oppositely aligned cylinder bores having their axis extending in the general direction of said split line, a double-ended piston having the ends thereof slidably disposed in one of said pairs of oppositely aligned cylinder bores, cylinder heads disposed adjacent each end of said cylinder block including passageways therein for providing communication to and from said cylinder bores, means including bearings for reciprocating said double-ended piston within said cylinder bores, one of said elongated cylinder block portions having a section therein adjacent its lower side serving as a lubricant sump, said cylinder block having an aperture therethrough directed substantially parallel to the axis of said double-ended piston, an elongated piston slidably mounted within said aperture including means thereon for operatively connecting said elongated piston to said double-ended piston for reciprocation therewith, means for conveying lubricant from said sump to said aperture, means for distributing lubricant from said aperture to said bearing means, and a one-piece sealing member having portions located between said cylinder block portions along said split line and portions thereof located between said cylinder block and said cylinder heads for preventing the escape of fluid from the compressor.

5. In a compressor, a cylinder block, cylinder head means for closing the end of said cylinder block, and the end of said cylinder block including a plurality of radially inwardly directed tabs thereon having the radially inner portions thereof axially overlying the outer face of said cylinder head means, each of said tabs biased axially outwardly of said cylinder head means, said tabs each having a radially outer portion forming in conjunction with the radially outer periphery of the end of said cylinder block a bearing surface, and strap means around the end of said cylinder block tightened against said bearing surface for forcing said outwardly biased tabs into axial abutment with said cylinder head means for holding it tightly against the end of said cylinder block.

6. In a compressor, a cylinder block separated by a longitudinally directed split line into a plurality of cylinder block portions, a cylinder head for closing one end of said cylinder block, and the end of said cylinder block having a plurality of radially inwardly directed tabs thereon with the radially inner portions thereof axially overlying the outer face of said cylinder head, each of said tabs biased axially outwardly of said cylinder head, said tabs each having a radially outer portion forming in conjunction with the radially outer periphery of the end of said cylinder block a bearing surface, and strap means around the end of said cylinder block tightened against said bearing surface for forcing said outwardly biased tabs into axial abutment with said cylinder head for holding it tightly against the end of said cylinder block.

7. In a compressor, a cylinder block having a cylinder bore therein, a piston slidably disposed in said cylinder bore, means for reciprocating said piston within said bore, a cylinder head including means for providing communication in and out of said cylinder bore, reed valve means disposed between said cylinder head and the end of said cylinder block for controlling fluid flow through said communication means, and the end of said cylinder block having a plurality of radially inwardly directed tabs thereon with the radially inner portions thereof axially overlying the outer face of said cylinder head means, each of said tabs biased axially outwardly of said cylinder head means, said tabs each having a radially outer portion forming in conjunction with the radially outer periphery of the end of said cylinder block a bearing surface, and strap means around the end of said cylinder block tightened against said bearing surface for forcing said outwardly biased tabs into axial abutment with said cylinder head means for securing said cylinder head to said cylinder block and for holding said reed valve means tightly between said cylinder head and the end of said cylinder block.

8. In a compressor, a cylinder block having a split line directed longitudinally thereof and extending therethrough for separating said block into a plurality of elongated portions, each of said block portions including a pair of oppositely aligned cylinder bores having their axis extending in the general direction of said split line, a double-ended piston having the ends thereof slidably disposed in one of said pairs of oppositely aligned cylinder bores, means for reciprocating said double-ended piston within said cylinder bore, cylinder heads for closing the ends of said cylinder block portions including means therein for providing communication in and out of said cylinder bores, reed valve means disposed between said cylinder heads and the ends of said cylinder blocks for controlling fluid flow through said communication means, and the ends of said cylinder block having a plurality of radially inwardly directed tabs thereon with the radially inner portions thereof axially overlying the outer face of said cylinder head means, each of said tabs biased axially outwardly of said cylinder head means, said tabs each having a radially outer portion forming in conjunction with the radially outer periphery of the end of said cylinder block a bearing surface, and strap means around the end of said cylinder block tightened against said bearing surface for forcing said outwardly biased tabs into axial abutment with said cylinder head means for securing said cylinder heads to said cylinder block and for holding said reed valve means tightly between said cylinder heads and the ends of said cylinder block.

9. In a compressor, a cylinder block having a split line directed longitudinally thereof and extending therethrough for separating said block into a plurality of elongated portions, each of said block portions including a pair of oppositely aligned cylinder bores having their axis extending in the general direction of said split line, a double-ended piston having the ends thereof slidably disposed in one of said pairs of oppositely aligned cylinder bores, means for reciprocating said double-ended piston within said cylinder bore, cylinder heads for closing the ends of said cylinder block portions including means therein for providing communication in and out of said cylinder bores, reed valve means disposed between said cylinder heads and the end of said cylinder blocks for controlling fluid flow through said communication means, and the ends of said cylinder block having a plurality of radially inwardly directed tabs thereon with the radially inner portions thereof axially overlying the outer face of said cylinder head means, each of said tabs biased axially outwardly of said cylinder head means, said tabs each having a radially outer portion forming in conjunction with the radially outer periphery of the end of said cylinder block a bearing surface, and strap means around the end of said cylinder block tightened against said bearing surface for forcing said outwardly biased tabs into axial abutment with said cylinder head means for securing said cylinder heads to said cylinder block and for holding said reed valve means tightly between said cylinder heads and the ends of said cylinder block, and a one-piece sealing member having portions thereof located between said cylinder block portions along said split line and portions thereof located between said cylinder block and said cylinder heads for preventing the escape of fluid from the compressor, said strap means serving as the sole means to maintain said sealing member in positive sealing engagement between said cylinder block portions and between said cylinder blocks and said cylinder heads.

10. In a compressor, a cylinder block having a split line directed longitudinally thereof and extending therethrough for separating said block into a plurality of elongated portions, each of said block portions including a pair of oppositely aligned cylinder bores having their axis extending in the general direction of said split line, a double-ended piston having the ends thereof slidably disposed in one of said pairs of oppositely aligned cylinder bores, means for reciprocating said double-ended piston within said cylinder bore, cylinder heads for closing the ends of said cylinder block portions including means therein for providing communication in and out of said cylinder bores, reed valve means disposed between said cylinder heads and the end of said cylinder blocks for controlling fluid flow through said communication means, and the ends of said cylinder block having a plurality of radially inwardly directed tabs thereon with the radially inner portions thereof axially overlying the outer face of said cylinder head means, each of said tabs biased axially outwardly of said cylinder head means, said tabs each having a radially outer portion forming in conjunction with the radially outer periphery of the end of said cylinder block a bearing surface, and strap means around the end of said cylinder block tightened against said bearing surface for forcing said outwardly biased tabs into axial abutment with said cylinder head means for securing said cylinder heads on said cylinder block and for holding said reed valve means tightly between said cylinder heads and the ends of said cylinder block, and a one-piece sealing member having O-ring portions on either end thereof located between said cylinder block and said cylinder heads and further including longitudinally directed spaced apart side portions having the ends thereof connected to points on each of said O-ring end portions and being located between said elongated cylinder block portions for preventing the escape of fluid from the compressor, said strap means serving as the sole means to maintain said sealing member in positive sealing engagement between said cylinder block portions and between said cylinder blocks and said cylinder heads.

11. In a compressor, a cylinder block having a cylinder bore therein, a piston slidably disposed in said cylinder bore, means for reciprocating said piston within said bore, a cylinder head including means for providing communication in and out of said cylinder bore, reed valve means disposed between said cylinder head and the end of said cylinder block for controlling fluid flow through said communication means, and one end of said cylinder block having a portion thereon directed inwardly into axial abutment with said cylinder head and adapted to be forced axially thereagainst when an inwardly directed force is applied on the periphery of the end of said cylinder block for securing said cylinder head to said cylinder block and for holding said reed valve means tightly between said cylinder head and the end of said cylinder block, said cylinder block having a section therein adjacent its lower side serving as a lubricant sump, said cylinder block having an aperture therethrough directed substantially parallel to the axis of said double-ended piston, an elongated piston slidably mounted within said aperture including means thereon for operatively connecting said elongated piston to said double-ended piston for reciprocation therewith, means for conveying lubricant from said sump to said aperture, and means for distributing lubricant from said aperture to said bearing means, and said reed valve means having a portion thereon disposed between said aperture and said lubricant distributing means for controlling the flow of fluid therethrough.

12. In a compressor, a cylinder block having a split line directed longitudinally thereof and extending therethrough for separating said block into a plurality of elongated portions, each of said block portions including a pair of oppositely aligned cylinder bores having their axis extending in the general direction of said split line, a double-ended piston having the ends thereof slidably disposed in one of said pairs of oppositely aligned cylinder bores, means for reciprocating said double-ended piston within said cylinder bore, cylinder heads for closing the ends of said cylinder block portions including means therein for providing communication in and out of said cylinder bores, reed valve means disposed between said cylinder heads and the end of said cylinder blocks for controlling fluid flow through said communication means, and the ends of said cylinder block having a portion thereon directed inwardly into axial abutment with said cylinder heads and adapted to be forced axially thereagainst when an inwardly directed force is applied on the periphery of the ends of said cylinder block for securing said cylinder heads to said cylinder block and for holding said reed valve means tightly between said cylinder heads and the ends of said cylinder block, said cylinder block having a section therein adjacent its lower side serving as a lubricant sump, said cylinder block having an aperture therethrough directed substantially parallel to the axis of said double-ended piston, an elongated piston slidably mounted within said aperture including means thereon for operatively connecting said elongated piston to said double-ended piston for reciprocation therewith, means for conveying lubricant from said sump to said aperture, means for distributing lubricant from said aperture to said bearing means and a one-piece sealing member having portions thereof located between said cylinder block portions along said split line and portions thereof located between said cylinder block and said cylinder heads for preventing the escape of fluid from the compressor.

References Cited by the Examiner
UNITED STATES PATENTS

| | | | |
|---|---|---|---|
| 588,735 | 8/97 | Schuster | 230—189 |
| 2,540,903 | 2/51 | Moushey et al. | |
| 3,038,414 | 6/62 | Margus | 103—149 |
| 3,057,545 | 10/62 | Ransom et al. | 230—186 |
| 3,082,693 | 3/63 | Budzich | 103—173 X |

LAURENCE V. EFNER, *Primary Examiner.*